United States Patent
Dorai et al.

(10) Patent No.: US 8,199,893 B2
(45) Date of Patent: Jun. 12, 2012

(54) SYSTEM AND METHODS FOR DISCLOSING CALL DESTINATION CHARACTERISTIC

(75) Inventors: Chitra Dorai, Chappaqua, NY (US); Gordon A. Kerr, Markham (CA); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1370 days.

(21) Appl. No.: 11/294,910

(22) Filed: Dec. 6, 2005

(65) Prior Publication Data

US 2007/0127653 A1 Jun. 7, 2007

(51) Int. Cl.
*H04M 3/42* (2006.01)

(52) U.S. Cl. ............. 379/207.14; 379/114.25; 379/189; 379/221.01; 379/201.07

(58) Field of Classification Search ............. 379/114.25, 379/207.14, 201.07, 189, 221.01
See application file for complete search history.

(56) References Cited

U.S. PATENT DOCUMENTS

| | | | |
|---|---|---|---|
| 5,768,360 A | 6/1998 | Reynolds et al. | |
| 5,987,102 A | 11/1999 | Elliott et al. | |
| 6,144,728 A | 11/2000 | Ukon | |
| 6,185,288 B1 | 2/2001 | Wong | |
| 6,678,359 B1 * | 1/2004 | Gallick | 379/88.17 |
| 2002/0052225 A1 * | 5/2002 | Davis et al. | 455/567 |
| 2003/0108158 A1 | 6/2003 | Brown et al. | |
| 2003/0156707 A1 * | 8/2003 | Brown et al. | 379/265.06 |
| 2004/0125924 A1 | 7/2004 | McMullin et al. | |
| 2005/0256866 A1 * | 11/2005 | Lu et al. | 707/5 |
| 2006/0246436 A1 | 11/2006 | Ohno et al. | |
| 2008/0005064 A1 * | 1/2008 | Sarukkai | 707/3 |

FOREIGN PATENT DOCUMENTS

| | | |
|---|---|---|
| CN | 1366410 | 8/2002 |
| JP | 11-177698 | 7/1999 |
| JP | 2003069709 | 3/2003 |

OTHER PUBLICATIONS

Chu-Carroll, et al., "Vector-based Natural Language Call Routing", Computational Linguistics, vol. 25, No. 3, pp. 361-388, Sep. 1999.

* cited by examiner

*Primary Examiner* — Antim Shah
(74) *Attorney, Agent, or Firm* — Novak Druce + Quigg LLP

(57) ABSTRACT

A system is provided for use by a caller placing a call with a calling device over a communications network linking a plurality of call destinations. The system includes a call-destination information source containing one or more call-destination characteristics associated one or more call destinations. The system further includes a processing unit communicatively linked to the call-destination information source. The processing unit generates one or more call-destination character indicators based on the one or more call-destination characteristics. A call-destination character indicator is generated in response to the system receiving call-destination identifier that identifies a particular call destination.

19 Claims, 7 Drawing Sheets

SYSTEM AND METHODS FOR DISCLOSING CALL DESTINATION CHARACTERISTIC

FIELD OF THE INVENTION

The present invention is related to the field of electronic communications and, more particularly, to the handling of calls placed over electronic communications networks.

BACKGROUND OF THE INVENTION

One of the most significant advancements in communications in recent decades has been the merger of telephony and computer-based technologies. This merger of technologies, has helped replace "plain old telephone service" (POTS) with new telephony architectures, a prime example being the Advanced Intelligent Network (AIN). The merger also has given rise to a plethora of new services and forms of communication, including cellular telephony, Voice-over-Internet Protocol (VoIP), and other modes of conveying voice and data information.

The accelerating advancements in telephony technology, specifically, and communications technology, generally, have produced enormous benefits. An occasional by-product of these advances, however, is consumer confusion, engendered by increased system complexities and a wide array of different services targeted to different segments of the consumer population. In today's complex communications environment, for example, it is often not possible for a consumer placing a call over a telephony network to understand the particular characteristics of a call destination or the nature of the phone charges that may be incurred by making a call, at least before placing the call and being connected to the call destination.

When coupled with the ever increasing complexities of emerging telephony technologies, a consumer's inability to ascertain certain characteristics about a call destination before placing a call can result in the consumer incurring a phone charge that was not anticipated or, worse, being the victim of a telephone scam.

A frequent telephone scam is for an unknown caller to leave a message encouraging the consumer to return the call at a given phone number. When the consumer dials the phone number left by the unknown caller, the consumer incurs a significant charge that accrues not to a legitimate service provider but instead to the unscrupulous, albeit unknown, caller who left the phone number. An even more sophisticated scheme involves an unknown caller who leaves a message stating that the consumer has won a prize and should dial back using a code followed by an 800 number to claim the prize. When the consumer follows the unknown caller's dialing instructions, the consumer unwittingly programs his or her phone to forward calls to a long-distance operator. The instigator of the scam, as a result, can call the consumer's number and be forwarded to a long-distance operator, allowing the scam artist to then place long-distance calls that are subsequently billed to the consumer's telephone number.

To date, no wholly effective and efficient mechanism has been devised for alerting a consumer, prior to the consumer's making a call, of the risk associated with making the call. More particularly, there is no satisfactory mechanism for a consumer to ascertain whether the reputation of a call destination warrants further inquiry as to the nature of the unknown caller or avoidance of a call to the particular destination altogether. Although many service providers offer caller ID and call blocking features, these features are little or no help in safeguarding against scams or providing useful information about an entity associated with the call destination.

Relatedly, even if the identity of an entity associated with a phone number can be easily ascertained, there is no mechanism in the context of telephony-based systems for determining the reputation of the entity. A business entity, for example, may widely advertise its telephone number, but a consumer that calls the entity may know little if anything about the entity's reputation before calling. To be adequately informed, the consumer is likely to have to make additional calls beforehand to a regulatory agency or non-governmental organization such as a better business bureau or credit agency. New and emerging telephony technologies provide new modes of connecting to different entities but provide little or no information about entity reputation prior to a consumer's making an initial call to the entity.

Another problem stemming from consumers not fully appreciating the complexities of new and emerging telephony technologies concerns the fact that oftentimes telephony service is not metered. Many of the service plans offered by service providers are so-called "all-you-can-eat" plans, which, for example, provide unlimited telephony service to all domestic call destinations. As a result, many subscribers to such calling plans reasonably expect that no additional charge is incurred by placing a call to domestic call destination. In fact, calls to some destinations, such as those having a 900 call prefix, do result in a charge. Nonetheless, there is as yet no effective or efficient mechanism for informing a consumer prior to the consumer placing a call that doing so will result in a phone charge.

SUMMARY OF THE INVENTION

The present invention is directed to systems and methods for providing information about one or more call destinations to a caller placing a call over a communications network. The information, more particularly, can correspond to one or more call-destination characteristics associated with particular call destinations.

One embodiment of the invention is a system for use by a caller placing a call with a calling device over a communications network linking a plurality of call destinations. The system can include a call-destination information source containing at least one call-destination characteristic associated at least one of the call destinations. The system further can include a processing unit communicatively linked to the call-destination information source. The processing unit can generate at least one call-destination character indicator based on the at least one call-destination characteristic, the indicator being generated in response to a received call-destination identifier identifying the at least one call destination.

Another embodiment of the invention is a method of providing call-destination information. The method can include receiving a call-destination identifier identifying a call destination, and determining at least one call-destination characteristic associated with the call destination. The method further can include generating a call-destination characteristic indicator based on the at least one call-destination characteristic.

Yet another embodiment of the invention is a method of providing a reputation service. The method can include enrolling at least one subscriber in a voluntary reputation service. Additionally, the method can include receiving a call indicator indicating a call placed by a caller to the at least one subscriber. The method further can include determining a reputation indicator of the at least one subscriber and providing the reputation indicator to the caller.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1A:
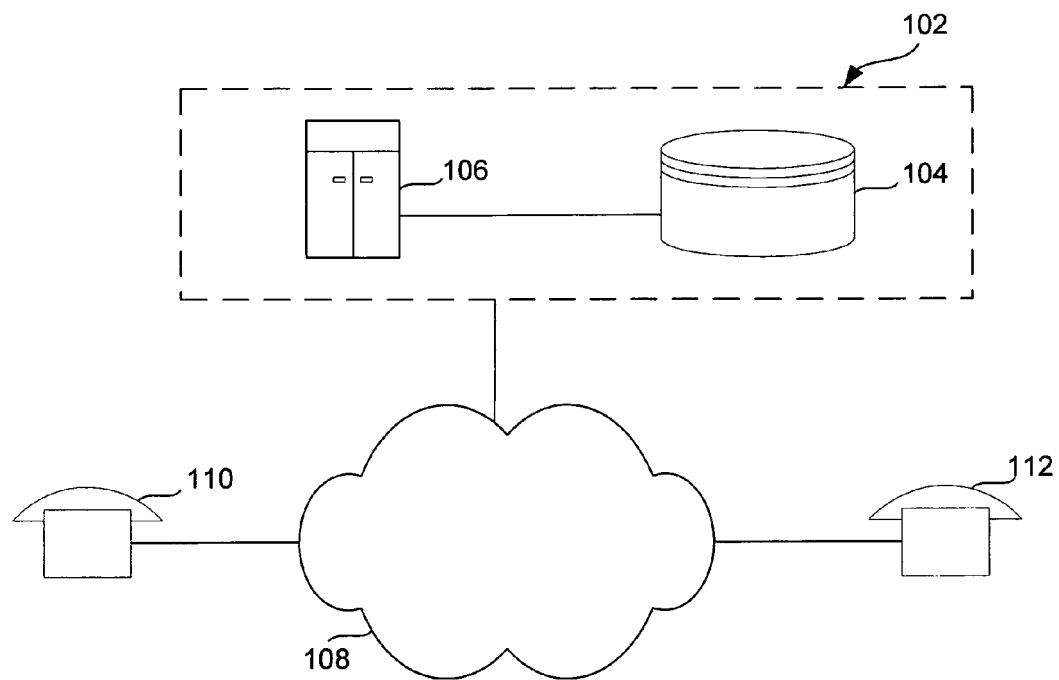
FIG. 1 is schematic diagram of a communications environment that includes a system for providing call destination information, according to one embodiment of the invention.

FIG. 1A is a schematic diagram of a communications environment 100A that, according to one embodiment of the invention, includes a system 102 for providing information about one or more call destinations. As described herein, the system 102 can provide information about a call destination prior to a caller's establishing a call connection with the call destination. This affords the caller an opportunity to terminate the call prior to connection based upon information provided by the system 102.

The system 102 illustratively includes a call-destination information source 104 and a processing unit 106 communicatively linked to one another. The system 102, in turn, is illustratively linked via the communications network 108 to a plurality of calling devices 110, 112 defining distinct call destinations. Although not explicitly shown, the communications environment 100A can include other call destinations, each identified with at least one separate calling device for placing and receiving calls via the communications network 108. As described more particularly below in the context of various representative embodiments, the communications network 108 can be one or a combination of various types, comprising different types of network nodes and devices for providing "plain old telephone services" (POTS), voice-over-IP (VoIP) communications, and other forms of voice and data communications.

Within the communications environment 100A, the call-destination information source 104 and processing unit 106 are communicatively linked to one another. The call-destination information source 104 can optionally be updated by an update source, such as a cache (not shown), linked to the call-destination information source via the network communications network 108. Moreover, in an alternative embodiment, the call-destination information source 104 and processing unit 106 are communicatively linked via the communications network 108. Accordingly, the call-destination information source 104 and processing unit 106 can each be co-located at the same site. Indeed, as typified by some of the exemplary embodiments discussed below, the call-destination information source 104 and processing unit 106 be brought together in a single device, such as a network server. Alternatively, however, the call-destination information source 104 and processing unit 106 can be located at different sites remote from one another, communicating indirectly via the communications network 108.

Figure 1B:
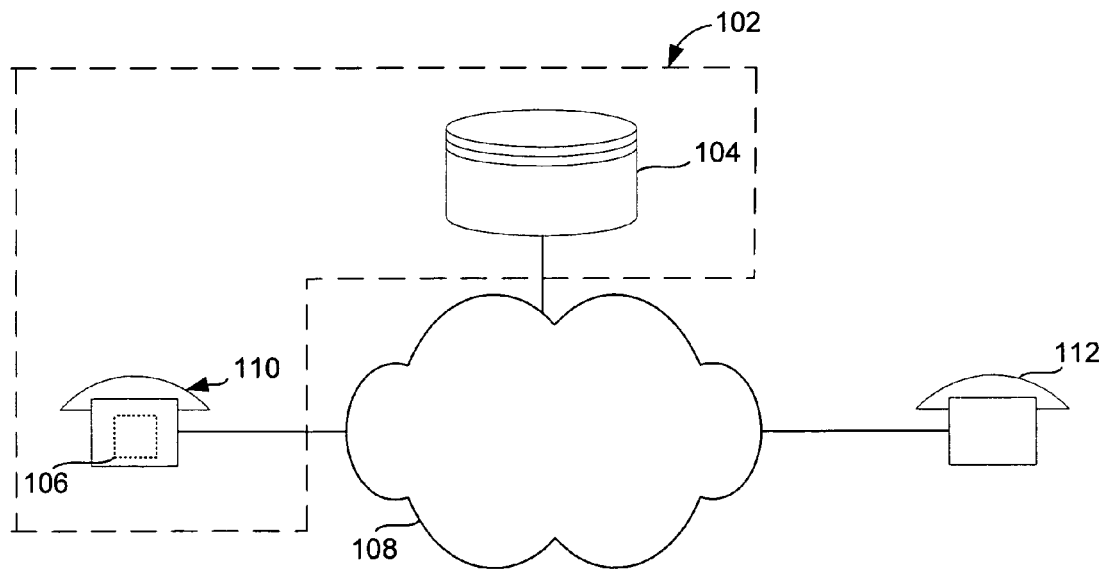

FIG. 1B is a schematic diagram of an alternative communications environment 100B. In this environment, the system 102 again comprises a call-destination information source 104 and a processing unit 106. According to this embodiment, however, the processing unit is housed within the calling device 110 device itself. The calling device 110 can be a cellular phone or other so-called "smart device" having information processing capabilities. The processing unit 106 contained with the calling device 110 accesses the call-destination information source 104 via the communications network 108.

In both FIG. 1A and FIG. 1B, the call-destination information source 104 contains data that associates at least one call-destination characteristic with at least one call destination. The call-destination characteristic can be based upon a reputation of an entity associated with the at least one call destination. The reputation can be, for example, the reputation of a business entity associated with the particular call destination. Alternatively, or additionally, the call-destination characteristic can indicate any charges that will be incurred by placing a call to the call destination. According to yet another embodiment, the call-destination characteristic alternatively or additionally can indicate the type of calling device 112 that handles calls at the call destination, such as whether the call destination is a fixed location using a landline calling device or a mobile location using a mobile or cellular phone device.

The processing unit 106 generates a call-destination indicator based on one or more call-destination characteristics. More particularly, the processing unit 106 receives a call-destination identifier, such as a telephone number, that identifies the call destination and, in response to receiving the call-destination identifier, generates the call-destination indicator indicating a characteristic of the call destination identified by the received call-destination identifier.

As exemplified by various embodiments described below, the processing unit 106 can be implemented in different forms. For example, the processing unit 106 can be implemented in dedicated hardwired circuitry comprising analog and/or digital components, the later typified by NAND, NOR, and other logic gates. The processing unit 106, alternatively, can be implemented in software instructions configured to run on an application-specific or general-purpose computing device. According to another embodiment, the processing unit 106 can be implemented in a combination of hardwired circuitry and software instructions.

The particular form of the call-destination identifier received by the processing unit 106 can vary depending on the nature of the communications network 108. For example, if the communications network 108 is a public switch telephone network (PSTN), the identifier can comprise dialed digits. Alternatively, if the communications network 108 is a public switch data network (PSDN) or integrated digital services network (IDSN), the identifier can comprise alphanumeric or other character strings. Accordingly, the identifier can also comprise, for example, an Internet protocol (IP) address, to and from which packetized voice data can be routed.

Depending on the nature of the communications network 108 and the type of the calling device 110 used to place and receive calls over the network, call-destination input can be supplied to the processing unit 106 in different forms. For example, with a telephone device such as a landline or wireless phone, a call-destination input can be supplied by dialing or keying-in a series of digits corresponding to a calling number using touch-tone buttons or interface keys. If the device has a voice-interactive capability, the input can be in the form of spoken numbers or some verbal command, for example. With a voice-interactive computing device, numbers or call commands can be entered by voice command and/or via a keyboard, for example.

Similarly, the nature of the communications network 108 and the type of the calling device 110 dictate the form in which the call-destination characteristic indicator generated by the processing unit 106 is presented to a caller. For example, if the calling device 110 is a conventional telephone set, the call-destination characteristic indicator can be presented in the form of one or more tones or beeps corresponding to a particular call-destination characteristic. Alternatively, the call-destination can be presented in the form of recorded message. If the calling device 110 has one or more lights, for example, the call-destination characteristic indicator can be presented in the form of a blinking light or a light-array pattern, including ones comprising different colored lights. If, alternatively or additionally, the calling device 110 has a screen display such as ones commonly found on cellular phones, for example, the call-destination characteristic indicator can be presented in the form of an image, a visual text message, or other visual indicator of a call-destination characteristic.

The processing unit 106 further can determine whether and/or under what conditions the call-destination indicator generated based on one or more call-destination characteristics is to be provided to a user. The determination can be made according to different criteria. One criterion is a predetermined caller preference, according to which only certain types of call-destination indicators are provided. For example, the user can subscribe to a service that provides the user call-destination indicators when the user enters call-destination input from a telephone, cellular phone, or computing device through which the user accesses telephony service. According to this embodiment, the service to which the user subscribes can allow its subscribers to pre-specify the type of call-destination indicators and/or conditions under which they wish to receive such information.

One type of service enabled by the invention is one in which different business entities voluntarily supply reputation data that, as described below, can be updated based on customer feedback. The reputation data can be supplied, for example, when a caller dials or otherwise seeks to connect to a calling device identified with a particular entity. According to one embodiment, as further described below, a call-destination indicator is provided only if there is a certain level of confidence that can be assigned to reputation call-destination characteristic or if there is an adequate reputation history associated with the entity.

If the system 102 is maintained and operated by a service provider, call-destination indicators can be provided by the processing unit 106 depending on a caller's class of service. Alternatively, the service provider can be required by a regulatory agency, such as a public service commission, to supply certain types of call-destination indicators. For example, a regulatory agency can require that, when a caller dials or otherwise supplies call-destination input, the service provider must provide a call-destination indicator indicating whether there is a charge for the call.

Another criterion by which the processing unit 106 can determine whether to provide a call-destination indicator is a caller-selected control variable. A caller-selected control variable, for example, can dictate that calls placed to certain call destinations be blocked and that an accompanying message inform the caller that a special code is needed before connecting to the corresponding call destination. This embodiment can be used, for example, as a form of parental control to prevent members of a household from using a home-based or mobile phone from accessing selected call destinations.

According to another embodiment, the call-destination information source 104 comprises a database whose data elements are call-destination characteristics pertaining to different call destinations. The database can reside on a remote server that is accessed by the processing unit 106 via a data communications network. Accordingly, the processing unit 106 is able to obtain the call-destination characteristics that are the basis of the call-destination character indicators generated by the unit by accessing the data elements stored in the database. Various operations can be performed for accessing the desired data. These include performing a database lookup, initiating a remote procedure call, initiating a Web-services call, or carrying out an Internet-based transaction, as will be readily understood by those of ordinary skill in the art.

According to yet another embodiment, the call-destination information source 104 comprises an updatable database whose data elements correspond to the reputations of various entities associated with different call destinations. The database, moreover, can be updated based on update information. For example, the reputations can be reputations associated with business entities. Feedback can be supplied by callers via the communications network 108 based on their direct or over-the-network dealings with the business entities.

According to still another embodiment, the system 102 includes an additional processing unit (not illustrated) communicatively linked to the updatable database for performing various update functions. Optionally, the additional processing unit can have a machine-learning capability for updating the call-destination characteristics. The machine-learning capability can be implemented using one or more adaptive learning algorithms. The algorithms can be applied to user-supplied feedback. Based on the updating of data, the additional processing unit optionally can compute a probability-based confidence level of the reputation on which the call-destination characteristics are based.

In one aspect, the system 102 performs as a reputation service. For example, call destinations can be voluntarily enrolled in the reputation service by the entities associated with the call destinations. The system 102 can use an existing reputation service, such as a better business bureau or other public service organization, to initially construct a set of reputation-based call-destination characteristics. The information used to initially construct the set can be obtained from previously-registered complaints or other information supplied by an appropriate organization. From this start, as callers supply feedback and new entities are entered or deleted from the database, the reputation database can expand or otherwise be refined over time. Feedback additionally, or alternatively, can be provided by a private or public entity, such as a consumer-satisfaction rating service, better business bureau, or chamber of commerce. The feedback, moreover, can be automatically supplied via the communications network 108. For example, the system 102 can be configured to request that a caller press a specific key or key sequence to indicate their experience in dealing with the various entities. Other modes of feedback, depending on the nature of the communications network 108, can include the sending of e-mails and/or the accessing of one or more Web pages.

According to yet another embodiment, the call-destination information source 104 comprises an updatable database that is updated in response to calling patterns with respect to particular call destinations. Calling patterns can be assessed automatically based on communications traffic. In particular, consumer experiences with entities associated with particular call destinations can be inferred from the frequency and/or duration of calls to the call destinations. For example, calls of long duration can indicate an understaffing of service personnel, which is often at the root of low customer satisfaction. Relatedly, numerous calls of inordinately short duration can indicate frequent mismatching of services requests and responses, also the basis of low customer satisfaction. Accordingly, entity reputations can often be inferred by calling patterns to a call destination.

Optionally, according to this embodiment, the system 102 can further comprise an additional processing unit (not shown) communicatively linked to the updatable database and endowed with a machine-learning capability, as already described. More particularly, call-destination characteristics can be updated by applying one or more adaptive learning algorithms to calling patterns involving one or more of the call destinations.

It will be readily apparent that the system 102, according to various other embodiments, can be an integral component of a more broadly-based third-party service organization. For example, when integrated into the operative structure of a consumer rating organization, the call-destination information source 104 can be configured with information about the quality of restaurants, hotels, retail merchants, and/or various other providers of consumer services and products. Accordingly, for a caller who places a call to make a reservation at a restaurant or hotel, for example, the processing unit 106 can provide a call-destination characteristic indicator that might be presented on a visual display as four stars or in a recorded message stating that "this is rated a four-star establishment." Similarly, a caller who calls a particular retail merchant can be provided a call-destination characteristic indicator indicating the different types or products or services the merchant provides. As already described, the call-destination information source 104 can comprise an updatable database that is updated with consumer-supplied feedback to which various machine-learning algorithms can be applied.

Relatedly, a local better business bureau might finance its operations by offering to maintain a network-accessible call-destination information source 104 configured with data typically maintained by such a bureau. The call-billing features of the communications network 108 can be used to assess a charge for such information, and earned service fees can thus be allocated appropriately between the network service provider and the organization that maintains the call-destination information source 104.

Figure 2:
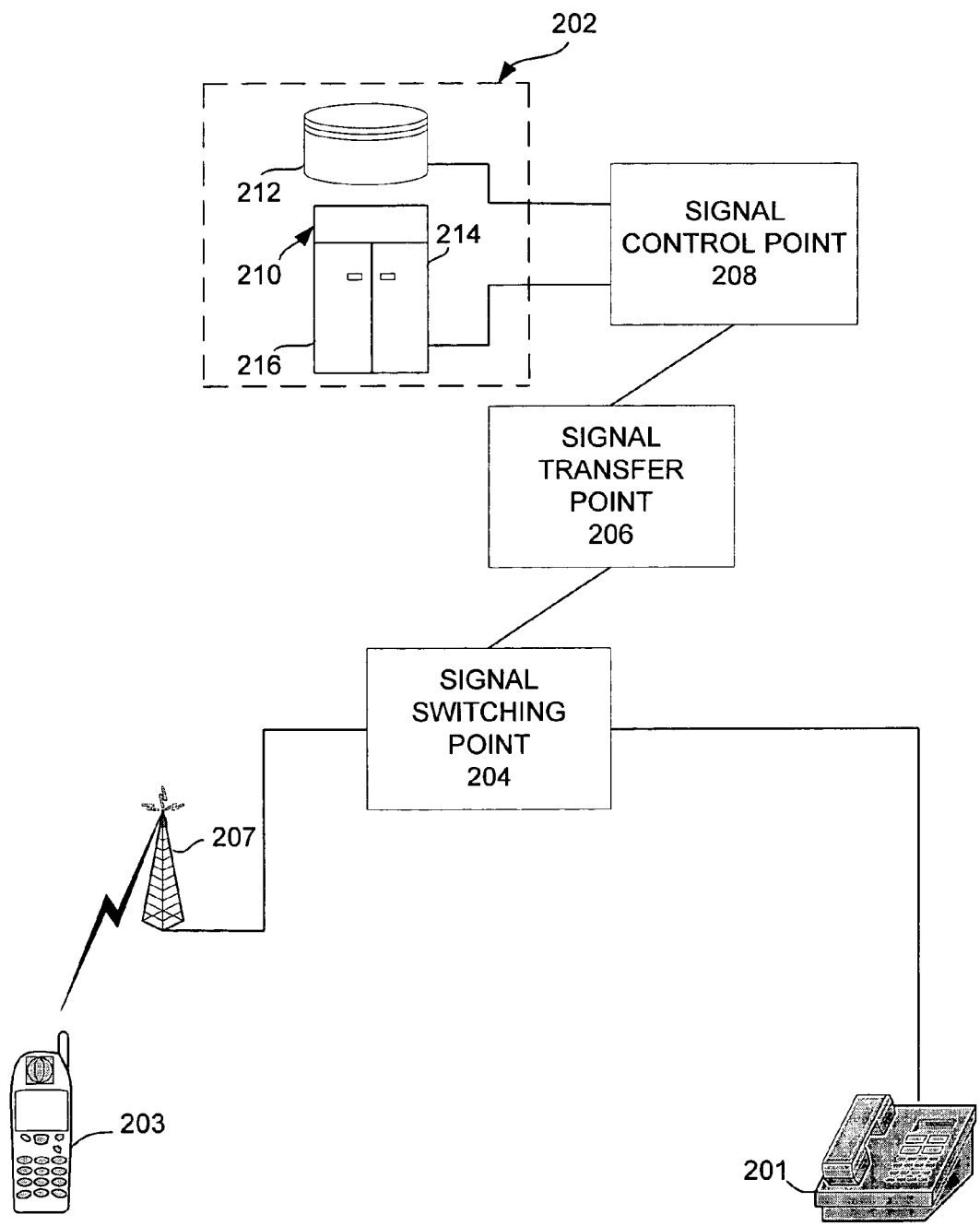
FIG. 2 is a schematic diagram of a communications environment that includes a system for providing call destination information, according to another embodiment of the invention.

FIG. 2 is a schematic diagram of select portions of an exemplary PSTN 200 that includes a system 202 for providing call-destination information, according to another embodiment of the invention. The PSTN 200 is accessed by subscribers to the network using various calling devices, two types of which are illustratively shown—a landline telephone 201 and a cellular phone 203 that connects to the network via a cellular tower 207.

The PSTN 200, for example, can be an SS7 network based on common channel signaling (CCS) technology and configured according to an advanced intelligent network (AIN) architecture. Three exemplary elements of the PSTN 200 are shown, the elements corresponding to the three types of nodes of an SS7 network: an exchange or signal switching point (SSP) 204 that receives and initiates signaling messages; a packet switch or signal transfer point (STP) 206 that routes signaling messages; and a database or signal control point (SCP) 208 that contains status information that is used to process a call setup request.

The system 202 illustratively includes a reputation server 210 and a called-number characteristics database 212. The reputation server 210 illustratively comprises a call-destination data source 214 and a processing unit 216 in communication with the data source. The call-destination data source 214 comprises data elements that associate one or more call-destination characteristics with one or more call destinations, the call-destination characteristics being based on a reputation of an entity associated with at least one of the call destinations, as already described. The processing unit 216 generates a call-destination indicator based on the at least one call-destination characteristic in response to receiving a call-destination input indicating the call destination, as also already described. The indicator can be sent to a local switching facility, or central office, where network-subscriber lines are connected to switching equipment for establishing local and long-distance calls. Accordingly, the indicator, in one embodiment, can be applied at a local link, or "last mile," between a local telephone company switching facility and the subscriber's premises so as to avoid using more expensive network resources. The call-destination indicator also can be provided directly to a network subscriber via a calling device, such as the exemplary telephone 201 or cellular phone 203. The indicator, for example, can be in the form of a recorded message, one or more beeps or tones, or even a visual image or text message that can be seen on a display such as the view screen found on many types of cellular devices.

The called-number characteristics database 212 is also a type of call-destination data source, but, according to this embodiment, provides information about charges and/or calling devices associated with particular call numbers. For example, the called-number characteristics data source 212 can provide information regarding whether or not a charge is incurred for placing a call to a particular call number. Alternatively, or additionally, the called-number characteristics data source 212 can provide information regarding the type of device associated with a particular called number; for example, whether the calling device is a landline telephone or whether the calling device is a cellular telephone. According to yet another embodiment, the called-number characteristic data source 212 can alternatively or additionally provide an indication of whether dialing a particular call number connects the caller to a calling device maintained by a business or a private household.

It will be readily apparent, therefore, that optionally the reputation server 210 and called-number characteristics database 212 can both be used in a complementary fashion. Specifically, in one possible scenario, a service subscriber dials a call number over the PSTN 200 and, responsive to the subscriber's dialing the call number, receives a call-destination characteristic indicator based on information contained in the called-number characteristics database 212 and informing the subscriber about some aspect of the call destination. Alternatively, the call-destination characteristic indicator can inform the subscriber that the call number dialed is associated with a business or other entity for which information is available so that the subscriber has the option to hang up or otherwise delay establishing a connection to the called number and then access the reputation server 210 independently. The reputation server 210 could then provide an indication of the reputation of the business entity associated with the call number. The caller would then be able to make a more informed decision as to whether or not to resume establishing a connection to the particular call number.

In another aspect, the same subscriber receives a voice message on his or her answering machine, the message being in the unrecognized voice of someone claiming to be an acquaintance and requesting that the subscriber call back at a particular call number. When the subscriber dials the call number, the called-number characteristics database 212 is automatically accessed, and the subscriber hears over his or her telephone set a recorded message such as: "You will receive an additional charge for dialing this number. Please hang up if you do not wish to continue." The subscriber is thus afforded the opportunity to hang up before establishing a telephone connection and incurring a charge.

In still another aspect, the subscriber obtains the call number for an electrician and dials the number. When the number is dialed, the subscriber automatically accesses the reputation server 210 and hears a tone indicating that there is a low consumer-satisfaction score associated with the service entity. The subscriber is again afforded the opportunity to hang up before establishing a telephone connection.

Figure 3:
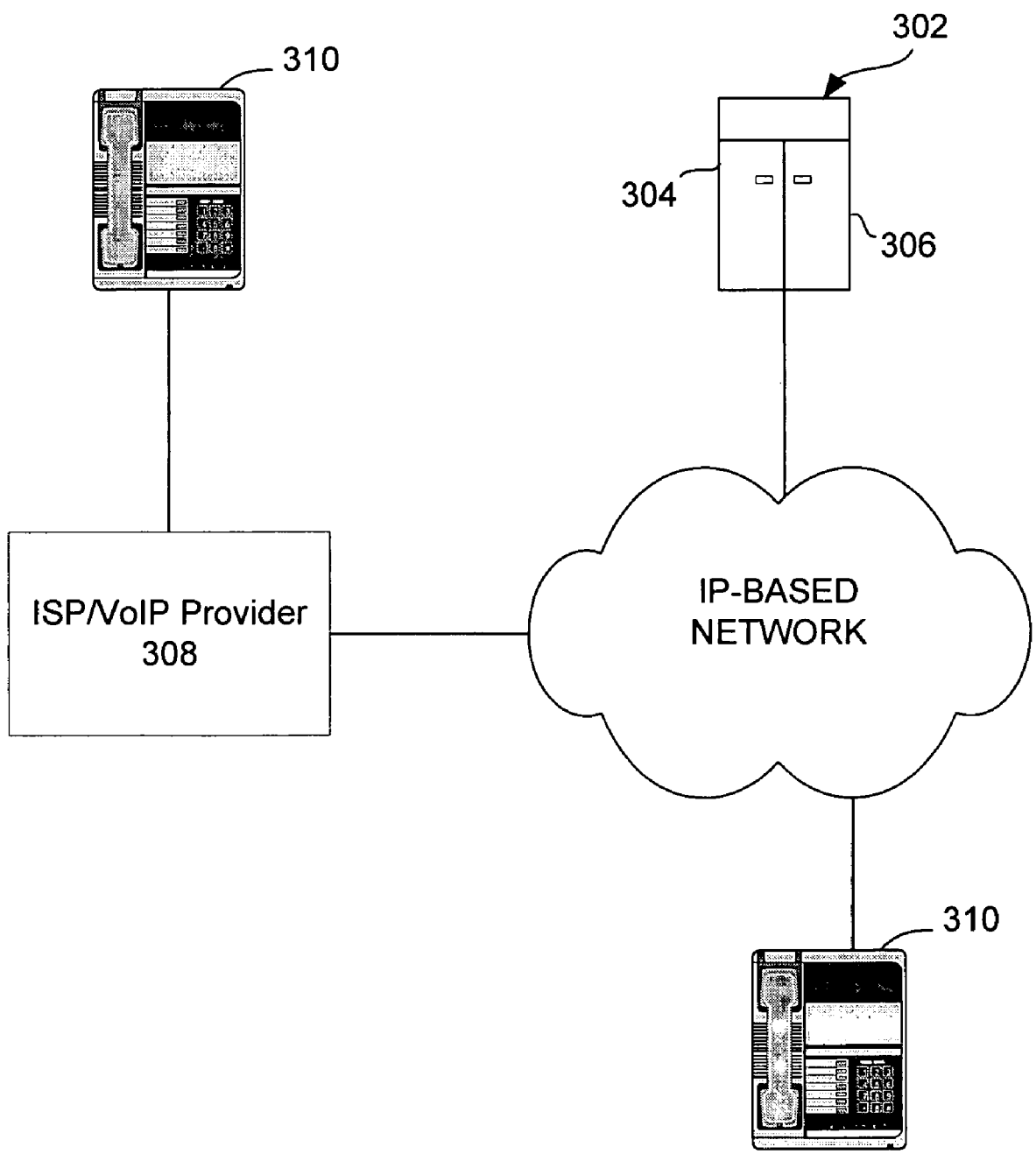
FIG. 3 is a schematic diagram of a communications environment that includes a system for providing call destination information, according to yet another embodiment of the invention.

FIG. 3 is a schematic diagram of select portions of an exemplary Voice-over-Internet Protocol (VoIP) network 300 that includes a reputation server 302 for providing call-destination information, according to another embodiment of the invention. The reputation server 302 illustratively comprises a call-destination information source 304 and a processing unit 306 communicatively linked to one another. Different calling devices are linked via the VoIP network 300 through an Internet Service Provider or VoIP provider, ISP/VoIP provider 308. Two exemplary devices, VoIP phones 310 connected to the network, are explicitly shown. Alternatively, a cellular phone 203 can be connected to the network via a cellular tower 207 as shown in FIG. 2

The call-destination information source 304 contains one or more call-destination characteristics associated with at least one call destination. The processing unit 306 generates at least one call-destination characteristic indicator based on one or more call-destination characteristics in response to a received call-destination identifier identifying the at least one call destination. The reputation server 302 is illustratively positioned remote from the ISP/VoIP provider 308, but it will be readily appreciated that the reputation server alternatively can be positioned at the site and incorporated into infrastructure maintained by the ISP/VoIP provider. Accordingly, the reputation server 302 can be maintained and operated by the ISP/VoIP provider 308 or, alternatively, by an independent reputation service.

Figure 4:
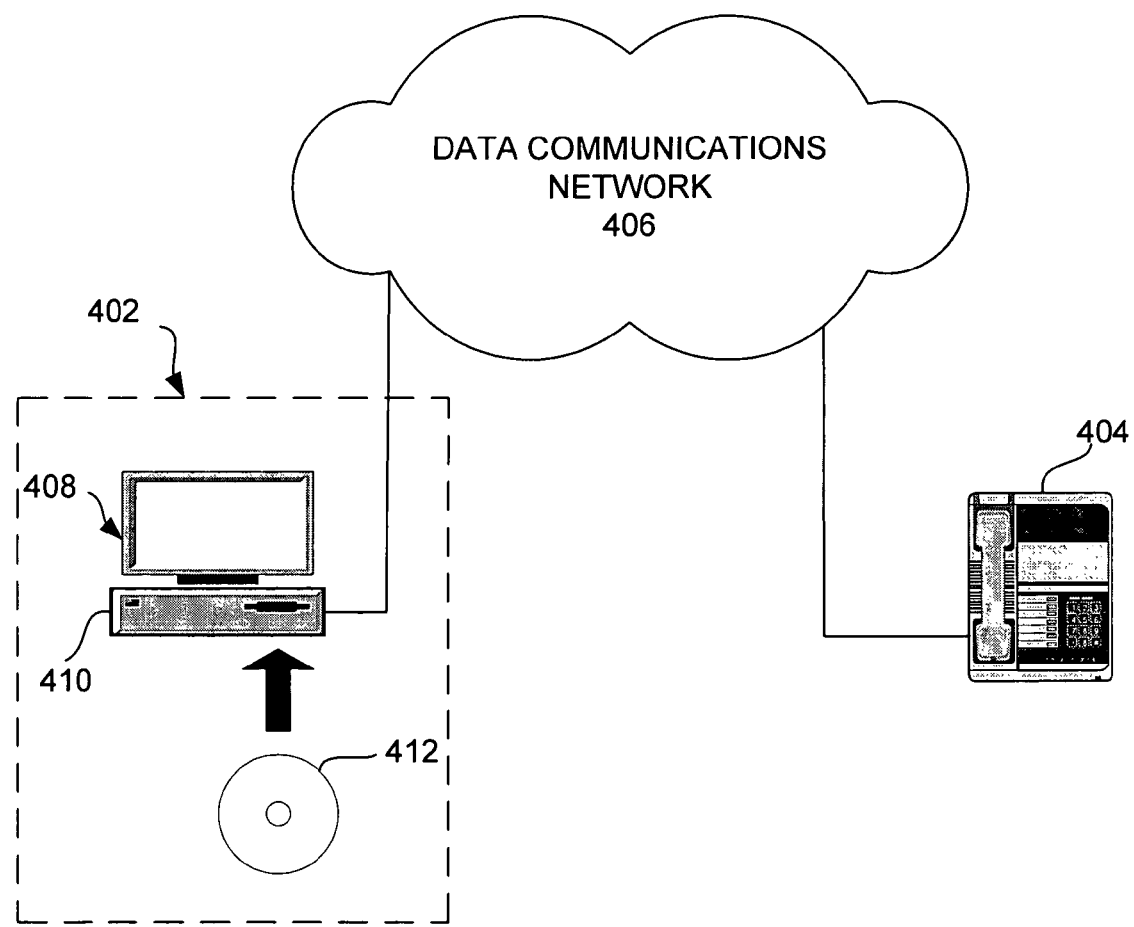
FIG. 4 is a schematic diagram of a communications environment that includes a system for providing call destination information, according to still another embodiment of the invention.

FIG. 4 is a schematic diagram of a communications environment 400 that, according to yet another embodiment of the invention, includes a system 402 for providing information about one or more call destinations. The system 402 illustratively connects to one or more calling devices 404 at various call destinations linked together via a data communications network 406, such as an IP-based communications network.

The system 402 illustratively comprises a computing device 408 that has the capability for placing and receiving voice-based calls over the data communications network 406. The system 402 illustratively includes a processing unit 410, implemented in dedicated circuitry and/or software, and a call-destination information source 412. The call-destination information source 412 is illustratively embodied in a machine-readable medium, such as a compact disk (CD), that can be conveniently replaced at intermittent intervals. The call-destination information 412 source contains at least one call-destination characteristic pertaining to at least one call destination, as described above. The processing unit 410, as also described above, generates at least one call-destination characteristic indicator based on the at least one call-destination characteristic in response to a received call-destination identifier identifying the at least one call destination.

According to this embodiment, the system 412 is entirely located at the site of a caller who places calls with the computing device 408 over the data communications network. As already noted above, the caller is able to maintain an updated call-destination information source 412 by replacing one CD with another containing updated information. The call-destination information can provide a variety of types of information, including reputations of business entities, charges associated with calls placed to different call destinations, and a host of other information. Provided the caller has access to the data communications network 408, the caller is able to operate and maintain this feature without the assistance of a service provider.

Figure 5:
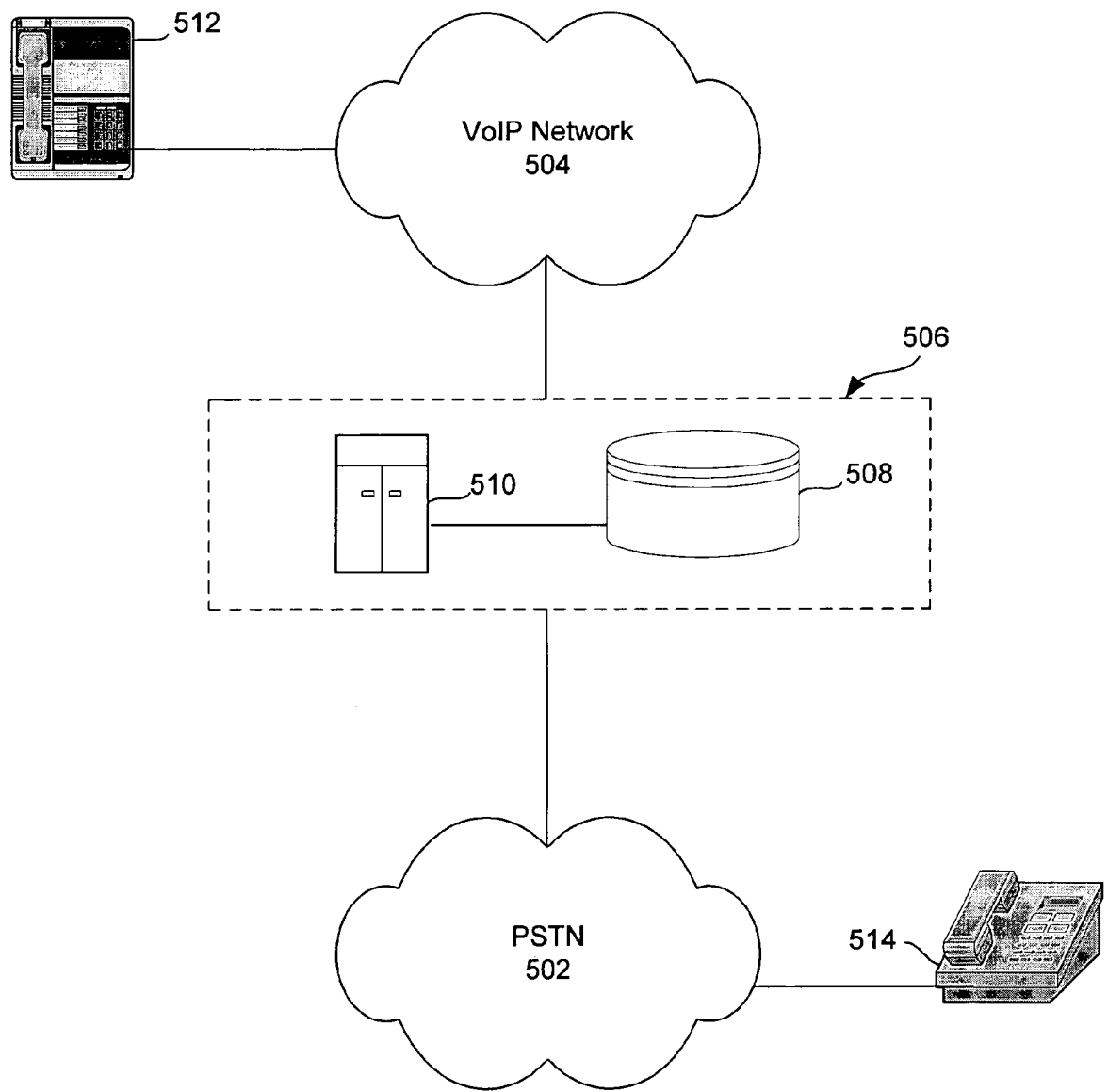
FIG. 5 is a schematic diagram of a communications environment that includes a system for providing call destination information, according to yet another embodiment of the invention.

FIG. 5 is a schematic diagram of a communications environment 500 that, according to still another embodiment of the invention, comprises both a PSTN 502 and VoIP network 504, and further includes a system 506 for providing information about one or more call destinations. The system 506 illustratively includes a call-destination information source 508 and a processing unit 510 communicatively linked to one another. Although illustratively linked directly to one another, the call-destination information source 508 and processing unit 510 can alternatively be communicatively linked through one or more networks. Accordingly, the call-destination information source 508 and processing unit 510 can be co-located at the same site or be remotely situated from one another.

The call-destination information source 508 contains at least one call-destination characteristic associated with one or more network-connected call destinations, as already described. The processing unit 510 generates at least one call-destination characteristic indicator based on one or more call-destination characteristics in response to a received call-destination identifier identifying a call destination, as also already described. The system 506 can be operated by a network service provider or an independent entity, such as a consumer-satisfaction rating agency or better business bureau. Thus, for example, when a subscriber calls a call destination from the subscriber's VoIP phone 512, the subscriber automatically accesses the system 506 through the VoIP network 504.

The subscriber can be calling, for example, to a "plain old telephone" 514 at the call destination. The call might be placed in response to an earlier received call or to connect to a business entity about whom the subscriber as little or no prior knowledge. In response to the caller's placing the call or otherwise seeking access to the call destination, the system 506 automatically provides to the subscriber one or more call-destination characteristic indicators. As described more particularly above, the indicator can be, for example, in the form of a tone or beeps, a recorded voice message, or other form. The call-destination characteristic indicated can be information about the reputation of an entity associated with the call destination, a charge that will be incurred by connecting with the calling device at the call destination, or other information as also described more particularly above.

Figure 6:
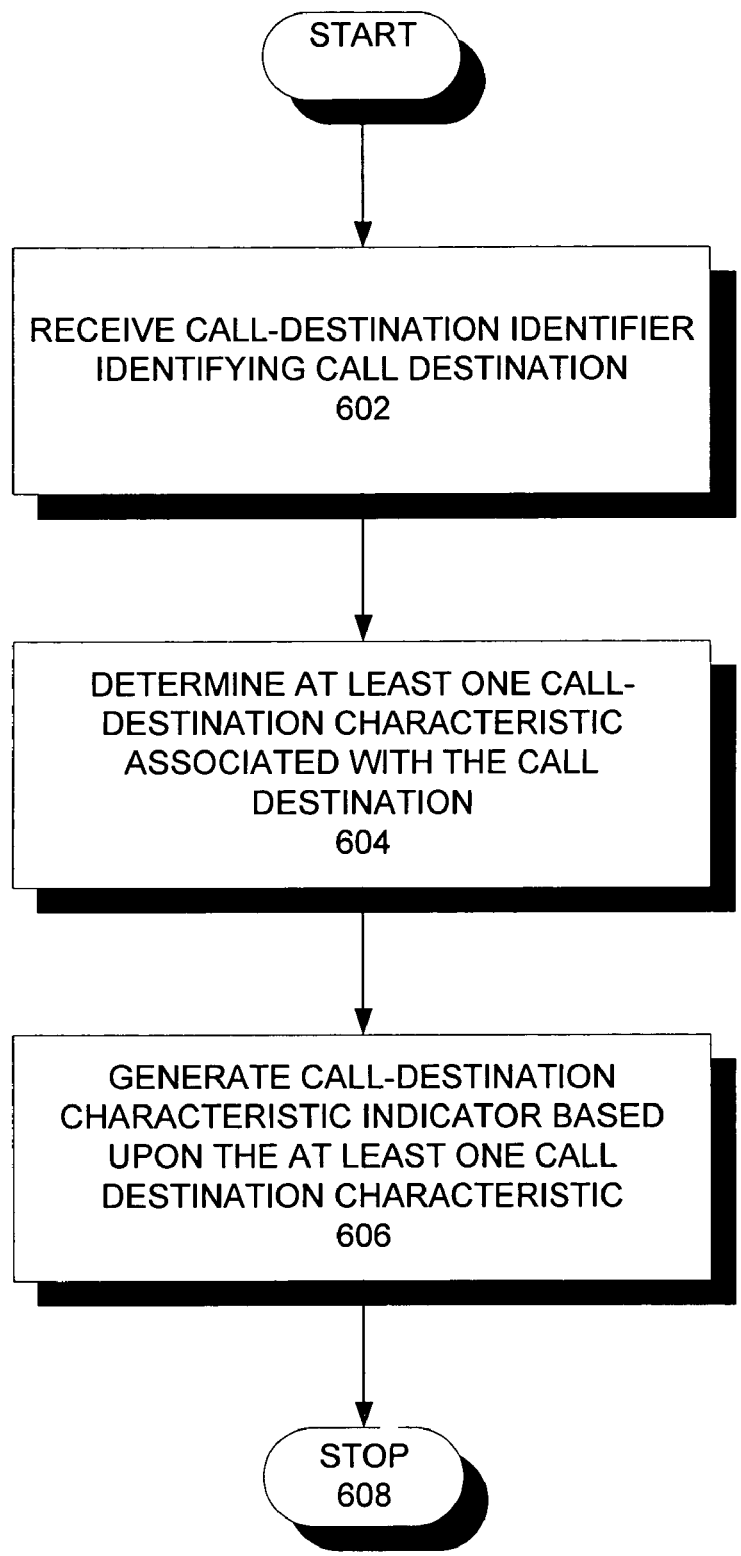
FIG. 6 is a flowchart of exemplary steps of a method for providing call-destination information, according to another embodiment of the invention.

FIG. 6 is flowchart of the exemplary steps of a method 600 for providing call-destination information, according to another embodiment of the invention. The method 600 illustratively includes receiving a call-destination identifier identifying a call destination, at step 602. Additionally, the method illustratively includes, at step 604, determining at least one call-destination characteristic associated with the call destination. The method further illustratively includes, at step 606, generating a call-destination characteristic indicator based on the at least one call-destination characteristic. The method 600 illustratively concludes at step 608.

The step 602 of receiving a call-destination identifier illustratively includes receiving dialed digits, receiving an IP address, returning a call via an enhanced telephone service feature such as "*69", and/or receiving a voice command. The step 604 of determining at least one call-destination characteristic illustratively includes performing a database lookup, completing a Web services transaction, and/or accessing a consumer research service or Web page.

Figure 7:
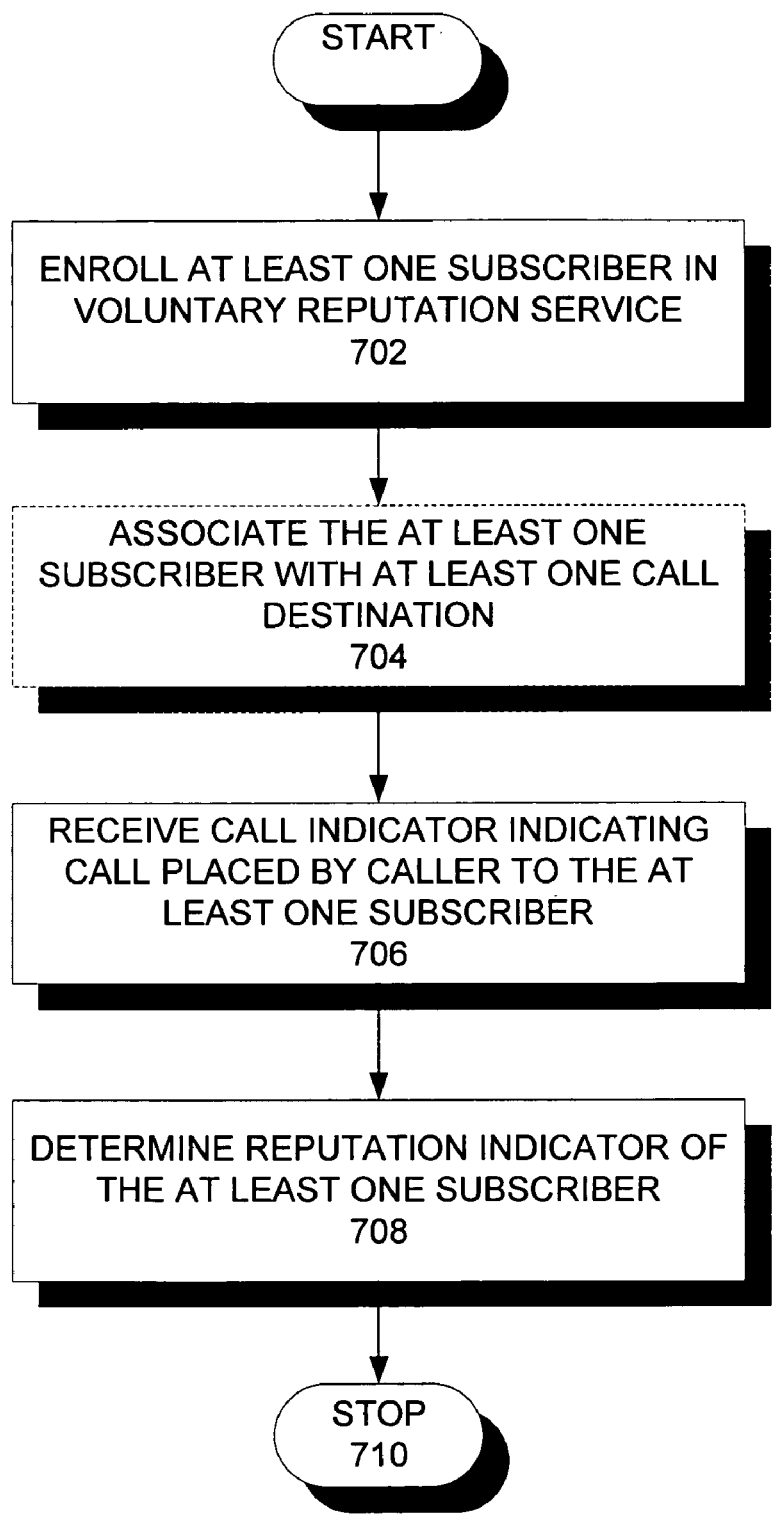
FIG. 7 is a flowchart of exemplary steps of a method of providing a reputation service, according to still another embodiment of the invention.

FIG. 7 is flowchart of the exemplary steps of a method 700 for providing a reputation service. The method 700 illustratively includes, at step 702, enrolling at least one subscriber in a voluntary reputation service. Optionally, the method 700 can include associating the at least one subscriber with at least one call destination at step 704. At step 706, the method 700 further illustratively includes receiving a call indicator indicating a call placed by a caller to the at least one subscriber. The method 700 additionally illustratively includes determining a reputation indicator of the at least one subscriber at step 708, the reputation indicator can optionally be provided to the caller directly or indirectly via a service provider. The method illustratively concludes at step 710.

The step 706 of determining a reputation indicator can include accessing a database a database of complaints filed with a third-party entity, such as a better business bureau or regulatory agency. Additionally, or alternatively, the step 706 of the step of determining a reputation indicator can include analyzing a frequency of calls and/or a duration of calls placed to the subscriber during a predetermined time period.

Optionally, the method 700 further includes receiving a call indicator associated with a non-subscriber, and providing a non-subscriber indicator to the caller. Additionally, or alternatively, the method 700 can further include receiving a feedback from the caller or a third-party entity such as a consumer-satisfaction rating service, better business bureau, or other entity.

As already noted throughout, the invention can be realized in hardware, software, or a combination of hardware and software. The invention also can be realized in a centralized fashion in one computer system, or in a distributed fashion where different elements are spread across several interconnected computer system's. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A system for use by a caller placing a call with a calling device over a communications network linking a plurality of call destinations, the system comprising:
a call-destination information source containing at least one call-destination characteristic associated with at least one of the call destinations, wherein the call-destination information source includes data provided by a third party;
a processing unit communicatively linked to the call-destination information source, the processing unit configured for:
prior to establishing the call between the caller and the at least one of the call destinations by attempting to connect the calling device with the at least one of call destinations, generating at least one call-destination characteristic indicator based on the at least one call-destination characteristic in response to a received call-destination identifier identifying the at least one call destination, providing the call-destination characteristic indicator to the caller based upon a predetermined criterion, prompting the caller with an opportunity to delay the establishing of the call, and allowing the establishing of the call to proceed automatically unless the caller delays the establishing of the call, wherein the call-destination characteristic indicator comprises a non-speech audible indicator indicative of the at least one call-destination characteristic and wherein the at least one call-destination characteristic is based on a reputation of an entity associated with the at least one call destination.

2. The system of claim 1, wherein the call-destination information source comprises an updatable database that is updated in response to feedback supplied by the caller.

3. The system of claim 2, further comprising an additional processing unit communicatively linked to the updatable database, the additional processing unit having a machine-learning capability for updating the at least one call-destination characteristic by applying an adaptive learning algorithm applied to user-supplied feedback.

4. The system of claim 3, wherein the additional processing unit computes a probability-based confidence level of the reputation on which the at least one call-destination characteristic is based.

5. The system of claim 1, wherein the call-destination information source comprises an updatable database that is updated in response to calling patterns with respect to the call destination.

6. The system of claim 5, further comprising an additional processing unit communicatively linked to the updatable database, the additional processing unit having a machine-learning capability for updating the at least one call-destination characteristic by applying an adaptive learning algorithm applied to calling patterns with respect to the at least one call destination.

7. The system of claim 6, wherein the calling patterns comprise at least one of frequency of calls and durations of calls placed to the at least one call destination.

8. The system of claim 1, wherein the at least one call-destination characteristic is based on a type of calling device used to handle calls placed from and received at the call destination.

9. The system of claim 1, wherein the processor generates the call-destination indicator in response to at least one of a call placed to the calling device from the call destination and a call placed to the call destination with the calling device.

10. The system of claim 1, wherein the processor determines whether to provide the call-destination indicator to the caller based on at least one of a predetermined caller preference, a caller class of service, a regulatory requirement, a reputation history of an entity associated with the at least one call destination, and a caller-selected control variable.

11. A method of providing call-destination information to a caller placing a call with a calling device over a communications network, the method comprising:
   receiving a call-destination identifier identifying a call destination;
   determining at least one call-destination characteristic associated with the call destination responsive to a call-destination information source including data provided by a third party;
   prior to establishing the call between the caller and the call destination by attempting to connect the calling device with the call destination, generating a call-destination characteristic indicator based on the at least one call-destination characteristic, providing the call-destination characteristic indicator to the caller based upon a predetermined criterion, prompting the caller with an opportunity for the caller to delay the establishing of the call, and allowing the establishing of the call to proceed automatically unless the caller delays the establishing of the call,
   wherein the call-destination characteristic indicator comprises a non-speech audible indicator indicative of the at least one call-destination characteristic and wherein the at least one call-destination characteristic is based on at least one of a reputation of an entity associated with the at least one call destination, calling patterns with respect to the call destination, and a type of calling device used to handle calls placed from and received at the call destination.

12. The method of claim 11, further comprising updating the at least one call-destination characteristic based on caller-supplied feedback.

13. The method of claim 11, wherein the step of updating comprises applying a machine-learning algorithm to the caller-supplied feedback.

14. The method of claim 11, further comprising determining whether to provide the characteristic indicator to a caller placing a call to the call destination, the determination being based upon a predetermined criterion.

15. The method of claim 11 further comprising:
   enrolling at least one subscriber in a voluntary reputation service;
   receiving a call indicator indicating a call placed by a caller to the at least one subscriber; and
   determining a reputation indicator of the at least one subscriber.

16. The method of claim 15, further comprising receiving a call indicator associated with a non-subscriber, and providing a non-subscriber indicator to the caller.

17. The method of claim 15, wherein the step of determining a reputation indicator comprises at least one of accessing a database of complaints filed with a third-party entity.

18. The method of claim 15, further comprising receiving a feedback from the caller.

19. The method of claim 15, wherein the step of determining a reputation indicator comprises determining at least one of a frequency of call and a duration of calls placed to the subscriber during a predetermined time period.

* * * * *